June 28, 1955  E. J. JORDAN  2,711,813
CONVEYOR MECHANISM
Filed Dec. 24, 1953  4 Sheets-Sheet 1

INVENTOR
EDGAR J. JORDAN
BY
*Bradley Cohn*
ATTORNEY

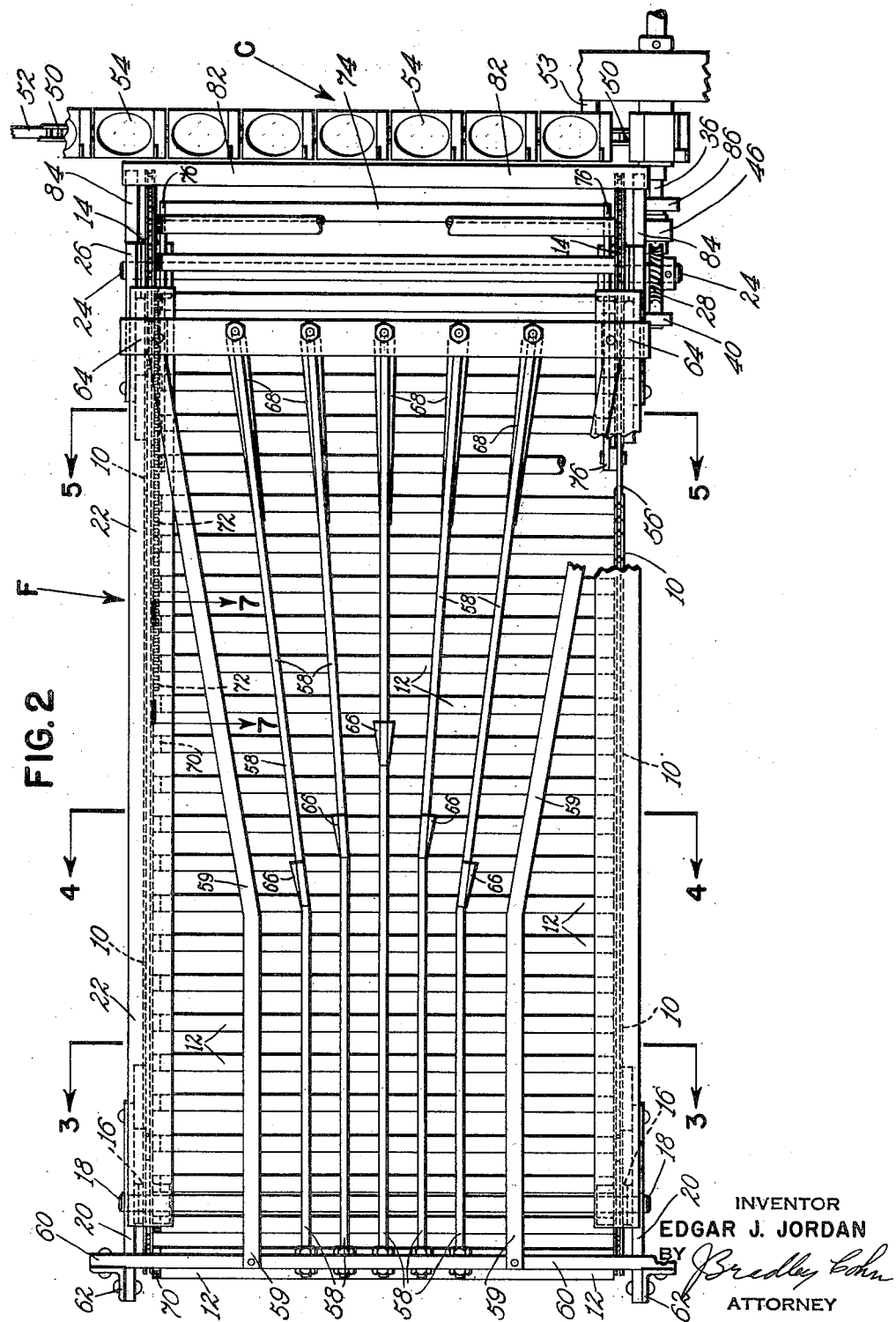

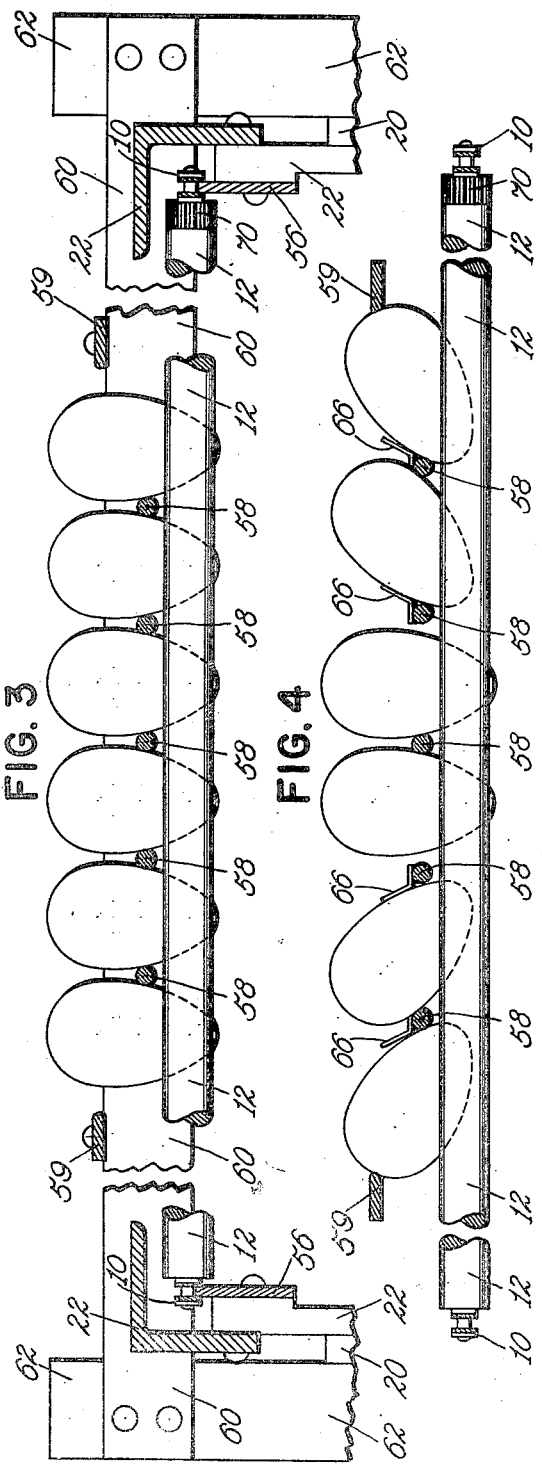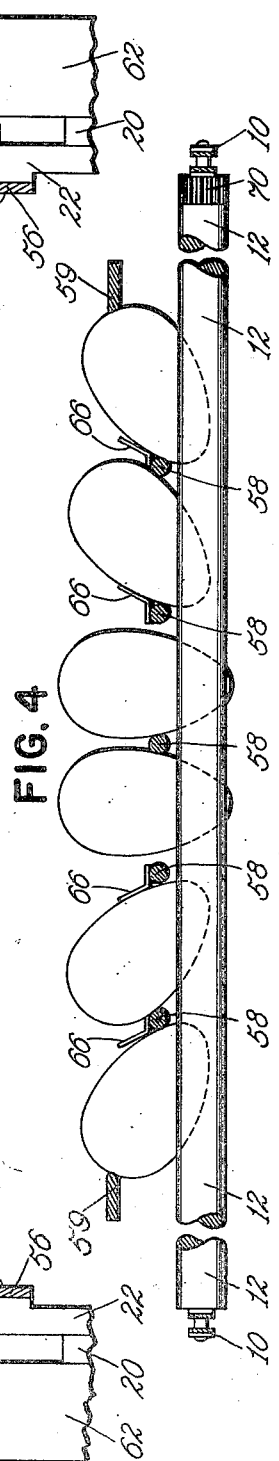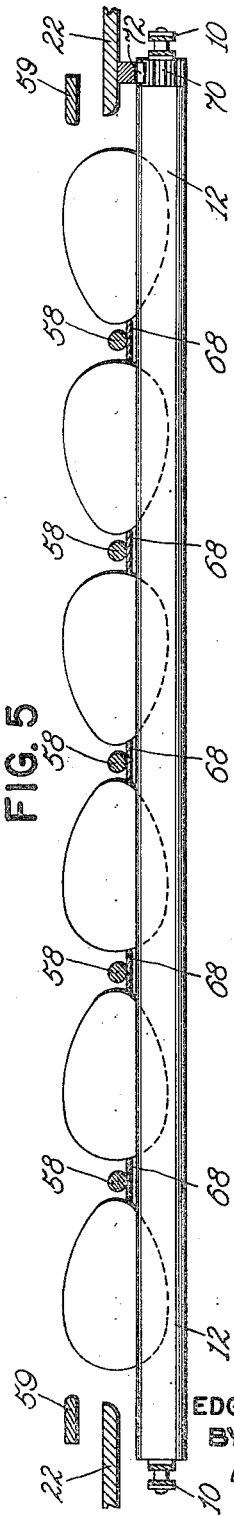

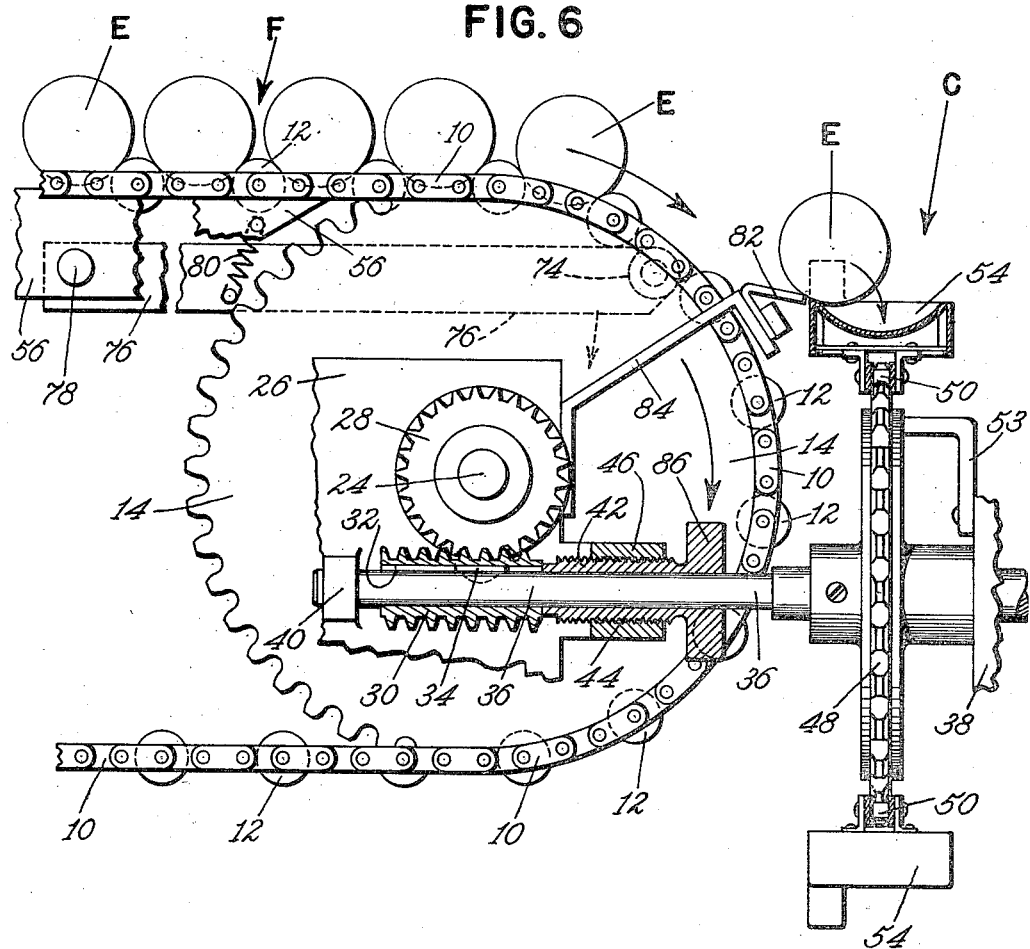
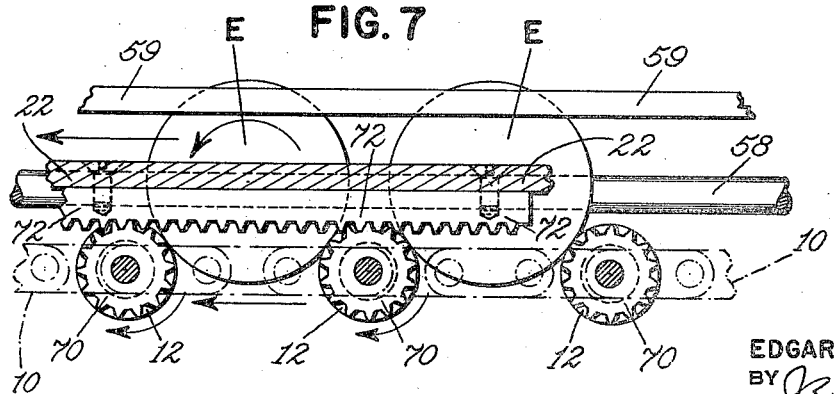

United States Patent Office 2,711,813
Patented June 28, 1955

2,711,813

CONVEYOR MECHANISM

Edgar J. Jordan, West Englewood, N. J., assignor to American Machine & Foundry Company, a corporation of New Jersey Application December 24, 1953, Serial No. 400,161

11 Claims. (Cl. 198—30)

This invention relates to a conveyor means for positively spacing ovoid objects from each other and positioning them so that their long axis is in the horizontal. The particular advantages lie in orienting and properly spacing articles, such as eggs, so that they may be thereafter individually handled or acted upon.

In the handling of eggs, it is frequently necessary to feed them into a machine one by one so that they may be individually acted upon in various manner, as for weighing and/or candling.

Since eggs are generally crated in flats of 36, it is an object of my invention to devise a means whereby a group of 36 eggs may be placed upon one conveyor belt and transferred to another conveyor in spaced tandem style.

It is a further object of my invention to devise an infeed conveyor and a cross feed conveyor so that when rows of eggs are placed on the first conveyor transverse thereto, they may be transferred row by row into spaced cup-like members on the cross conveyor.

It is a further object of my invention to support eggs point downward by four-point contact as they are delivered from conventional flats and then tilt them laterally when they are advanced forwardly along the conveyor. Finally, the eggs are rotated to encourage them to lie between rollers with their long axis horizontal where they may be further acted upon by spacer guides to give them a uniform center to center distance.

The novel features which I believe to be characteristic of my invention are set forth with particularity in the appended claims. My invention, itself, however, both as to its organization and method of operation may best be understood by reference to the following description taken in connection with the accompanying drawings, in which:

Fig. 2 is a plan view of the same;

Figure 1:
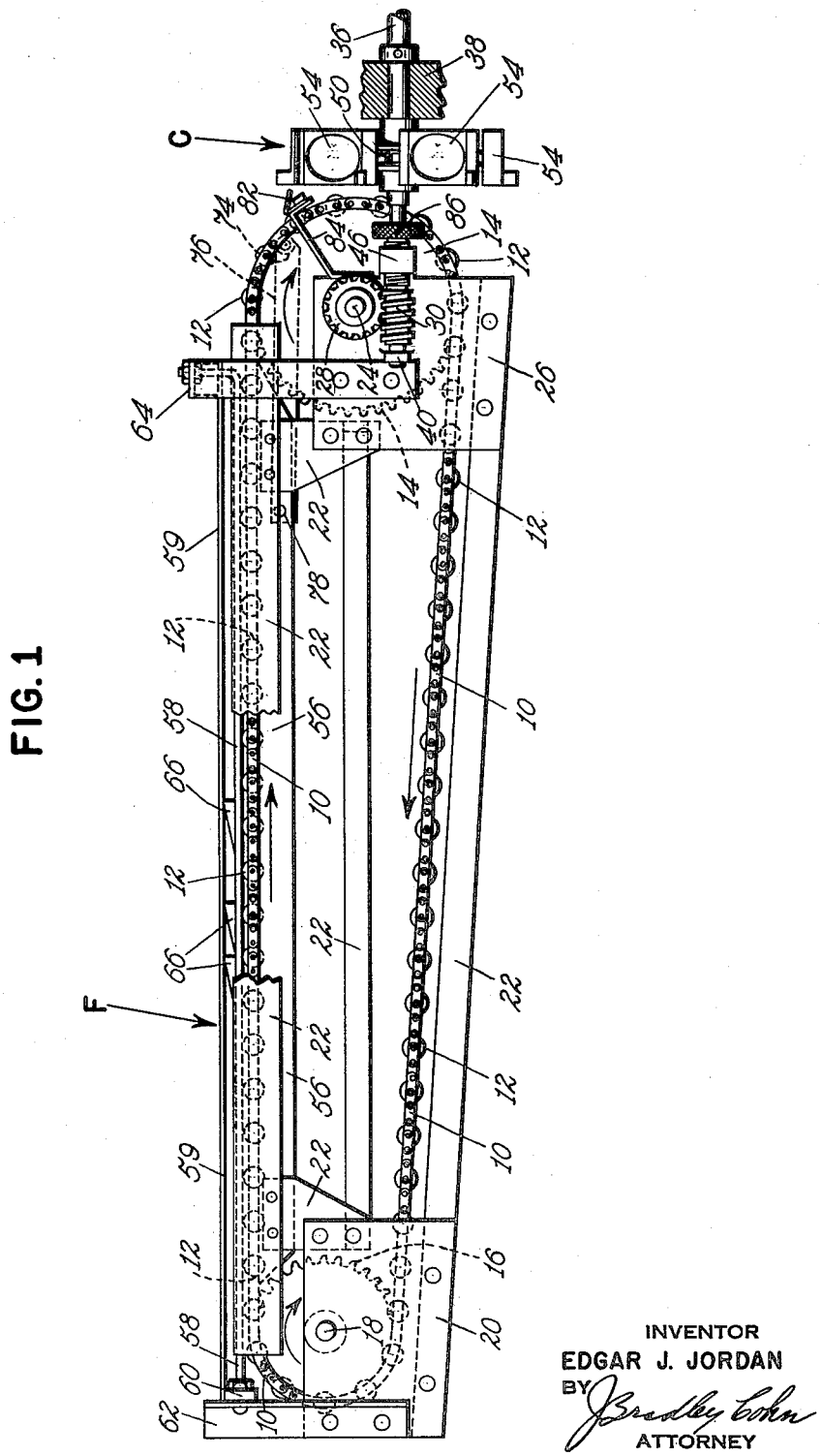
Fig. 1 is a side elevation of the infeed conveyor in conjunction with a cross feed cup conveyor.

Figs. 3, 4 and 5 are sectional end elevations of the infeed conveyor taken on lines 3—3, 4—4 and 5—5, respectively, of Fig. 2;

Fig. 6 is a side elevation partly in section of the discharge end of the infeed conveyor in conjunction with a cross feed cup conveyor illustrating the ejecting of the eggs from the infeed conveyor into the cup conveyor; and Fig. 7 is a partial sectional side elevation of the infeed conveyor, taken on line 7—7 of Fig. 2 illustrating the rotating mechanism for the egg-carrying conveyor members.

With reference to the drawings, the infeed conveyor F consists of two parallel spaced endless chains 10 pivotally supporting between them a plurality of equally spaced rollers 12. Each chain is driven from a sprocket 14 and led over an idler sprocket 16. Idler sprockets 16 are mounted on a horizontal shaft 18 supported by bearing plates 20, secured to a suitable frame structure 22.

The two driving sprockets 14 are secured to a horizontal drive shaft 24 supported by a pair of suitable bearing plates 26 secured to the frame structure 22. A worm wheel 28 is secured to shaft 24 and driven by worm 30. Worm 30 is provided with a longitudinal slot or keyway 32 which slidably engages with a key 34 held by a shaft 36 which also slidably supports and drives said worm 30. Shaft 36 is constantly driven by a suitable source of power (not shown) and supported by a bearing frame 38 and a bearing lug 40 projecting from one of the bearing plates 26. Shaft 36 is also supported by a sleeve bearing 42 having an external thread 44 engaging a threaded bearing lug 46 projecting from a bearing plate 26.

There is also mounted on shaft 36 a sprocket 48 which drives a cup conveyor C located at right angles and adjacent the delivery end of infeed conveyor F. Cup conveyor C consists of an endless chain 50 engaging drive sprocket 48 and an idler sprocket (not shown). The top run of chain 50 is guided and supported by a horizontal bar 52 (Fig. 2) suitably held and supported by brackets 53 secured to bearing frame 38. The chain 50 carries evenly spaced cups 54 which receive eggs E from infeed conveyor F as will be more fully described.

The upper runs of the endless chains 10 of the infeed conveyor F are also supported by means of horizontal guide rails 56 which are held by and secured to the main frame structure 22. Spaced above chains 10 and rollers 12 of infeed conveyor F are a plurality of longitudinal guide bars 58 secured at one end to a horizontal cross bar 60 held by a pair of brackets 62 attached to bearing plates 20. The other ends of said guide bars are fastened to and suspended from a bridge bracket 64 secured to bearing plates 26. The two outer guide bars 59 may be mounted higher and be of different shape than the bars 58 if desired. At the receiving end section where the eggs are placed in upright point-down position in the infeed conveyor, guide bars 58 are spaced in such a manner as to effect circumferential four-point contact of the eggs with the rollers 12 and the guide bars 58 as illustrated in Fig. 3 of the drawings.

The guide bars 58 and 59 progressively diverge to increase the center to center distance of the eggs in each row as they move from the receiving end section of the infeed conveyor to the discharge end. As may be seen in Fig. 2, the lateral bars 59 commence to diverge first, then the adjacent pair of bars 58 and after them the more central pair of bars 58.

Adjacent the diverging point, guide bars 58 on their upper edge are provided with suitably shaped deflector plates or tippers 66 which are employed for the purpose of tilting the large ends of the eggs which contain the air cells from the upright point-down position to a lateral or horizontal position, as illustrated in Fig. 4. This action progresses downwardly from the outside due to positioning of tipper 66 (Figs. 2 and 4).

Towards the discharge end of the conveyor, guide rods 58 are also provided with tapered guide plates 68 secured to the lower edges of rods 58. Guide plates 68 are employed to accurately space the eggs to coincide with the spacing of the cups 54 of cup conveyor C into which they will be transferred.

In order to facilitate tipping the eggs to the horizontal as well as moving them laterally, the rollers 12 are each provided with a gear 70 which at a predetermined point subsequent to tipper 66 are rotated by engaging a stationary gear rack 72 suitably secured to a member of frame structure 22. The rotation of rollers 12, of course, rotates eggs E, as illustrated in Fig. 7. The rotating eggs tend to maintain their horizontal position since they roll in their smaller diameter. They also, wheel-like, tend to respond better to the various lateral guide members along conveyor F. The stationary gear rack 72 may be of any desirable length but rotation of rollers 12 is preferable after the guide bars 58, 59 have moved apart. Otherwise, there is a tendency to produce end-for-end rotation which is undesirable.

The discharge end of the infeed conveyor is provided with an automatic ejecting mechanism. It is apparent that the eggs will eventually drop from the conveyor F by the force of gravity. However, small eggs will nest deeper between rollers 12 than large eggs. Accordingly, gravity would deliver them from conveyor F later than large eggs. It is necessary for high speed and close timing to eject at one time all the eggs of a row.

The ejecting mechanism consists of a horizontal ejector rod 74 pivotally attached at each end to the free end of an arm 76. Arms 76 are pivotally supported by suitable studs 78 on the chain guide rails 56. Arms 76 and ejector rod 74 are urged upward by tension spring 80 (Fig. 6) attached to each arm 76 and anchored in the respective guide rail 56. The ejector rod 74 is shorter than the spacing distance between conveyor chains 10 so it may enter successively between the rollers 12 to eject the eggs E as the ends of arm 76 engage the passing rollers in a cam-like fashion producing the necessary up and down motion. By this arrangement rod 74 contacts the small eggs first, raises them to the same level as the larger eggs, and all are ejected simultaneously from the rollers into cups 54 of cup conveyor C moving synchronously across the discharge end of infeed conveyor F. A suitably shaped bridge plate 82 mounted adjacent the discharge end of the infeed conveyor supports the eggs from the infeed to the cup conveyor. Bridge plate 82 is secured to a pair of brackets 84 mounted on the vertical edges of bearing plates 26 (Fig. 6).

The timing between conveyors C and F is critical and sensitive. Micro adjustment may be obtained by knob 86 of the threaded sleeve bearing 42. Rotation of the wheel 86 moves worm 30 along shaft 36. This, in turn, advances or retards the angular position of worm wheel 28 relative to shaft 36. The lateral thrust of worm 30 holds it against the leading end of sleeve bearing 42.

I claim:

1. In a device for orienting and spacing a plurality of articles, such as eggs, so they may be individually operated on, a primary conveyor comprising a pair of spaced endless chains having a plurality of elongated transverse equally spaced members mounted therebetween, a plurality of guide members positioned above said conveyor generally longitudinally thereto and diverging from the receiving end to the delivery end, a cross conveyor running at right angles past the delivery end of said primary conveyor, and an ejecting means to deliver eggs supported between said transverse members of said primary conveyor, said ejecting means comprising a pair of arms pivoted at their one end so that their free end may swing upwardly between said rollers and a further roller-like member supported between said free ends of said arms, means to urge said arms upwardly whereby said second-roller-like member will successively move upward with said arms between the transverse members of said conveyor and will be successively depressed by the action of said transverse members on said arm as they move along said conveyor to eject eggs nestled between said transverse members onto said cross feed conveyor.

2. A spacing device to receive a plurality of eggs positioned closely adjacent each other and with their long axis substantially in the vertical, said device comprising a pair of spaced endless chains, elongated transverse roller members rotatably mounted between said chains, stationary substantially longitudinal members spaced above the upper run of said conveyor to form with said transverse roller member a four-point contact support for each of said plurality of eggs placed thereon, said longitudinal stationary members being shaped to diverge toward the delivery end of said conveyor, tipping members mounted on said stationary guides at a point adjacent the point of divergence of said guides to engage an egg to tip it so that its long axis is horizontal and substantially transverse the direction of movement of said conveyor, and wedge members toward the delivery end of said conveyor to engage said horizontally positioned eggs and center them to equalize the center to center distance in a transverse row of eggs supported between said transverse members guided by said diverging members.

3. A device substantially as set forth in claim 2, further characterized by means to engage said rollers to rotate them to facilitate the movement of the eggs from the vertical to the horizontal by said tipping members.

4. A device as set forth in claim 2, further characterized by means to rotate said rollers at a point adjacent said spacing members on said guide members to facilitate the movement of said eggs along said transverse member to said equally spaced positions.

5. In a device for spacing and aligning ovoid articles, a conveyor comprising a pair of parallel spaced endless conveyor chains, a series of transversely positioned elongated rollers rotatably supported between said chains, stationary rods positioned above the upper run of said conveyor generally longitudinal thereto but in substantially parallel divergence from the longitudinal medial line of said conveyor, tipping members on said rods positioned to engage an object supported between said rollers of said conveyor to tip said object laterally toward the laterally adjacent diverging stationary rod, and means to rotate said rollers on their axis during transit beneath said stationary guide members whereby ovoid articles positioned vertically with respect to their long axis are tipped to the horizontal and spaced uniformly apart.

6. In a device for spacing and aligning ovoid articles, a conveyor comprising a pair of parallel spaced endless conveyor chains, a series of transversely positioned elongated rollers rotatably supported between said chains, a plurality of horizontal rods positioned above said conveyor, said rods being equally spaced one from another and for a short distance running substantially parallel to the medial line of said conveyor, then the lateral of said plurality of rods diverging gradually to the full width of said conveyor, then the more medial of said rods subsequently diverging in radiant fashion, said rods at the ends of said conveyor being substantially equally spaced from one another, tipping members on said rods positioned to engage an object supported between said rollers of said conveyor to tip said object laterally toward the laterally adjacent diverging stationary rod, and means to rotate said rollers on their axis during transit beneath said stationary guide members whereby ovoid articles positioned vertically with respect to their long axis are tipped to the horizontal and spaced uniformly apart.

7. A device as set forth in claim 5, further characterized in that an endless cross feed conveyor is positioned across the delivery end of said first-named conveyor to receive row by row said spaced apart articles from the delivery end of said first-named conveyor.

8. A device as set forth in claim 7, further characterized in that said endless cross feed conveyor has cup-like members secured thereon in tandem spaced relation, the center-to-center distance being substantially the same as the center-to-center distance between said stationary rods at the discharge end of said first-named conveyor.

9. In an egg handling machine, a primary infeed conveyor having a receiving end and a delivery end, said infeed conveyor comprising a pair of spaced endless chains, a plurality of elongated rollers transversely mounted between said chains and pivoted thereto to permit rotation around their axis, a plurality of stationary guide rods supported above the upper run of said conveyor, said guide rods being disposed at the receiving end of said conveyor in parallel spaced position to receive eggs point downwardly therebetween and between said rollers of said conveyor so as to provide four-point contact with said eggs, said guide rods then diverging toward the delivery end, tipping members mounted on said guide rods adjacent the point of divergence to tip said eggs from the vertical to nest between said rollers and said guide rods, and means to rotate said rollers on their axis during their passage beneath the diverging guide rods whereby said eggs are rotated to facilitate their following said guide rods to encourage them to lie horizontally with respect to their long axis.

10. In an egg handling machine, a primary infeed conveyor having a receiving end and a delivery end, said infeed conveyor comprising a pair of spaced endless chains, a plurality of elongated rollers transversely mounted between said chains and pivoted thereto to permit rotation around their axis, a plurality of stationary guide rods supported above the upper run of said conveyor, said guide rods being disposed at the receiving end of said conveyor in parallel spaced position to receive eggs point downwardly therebetween and between said rollers of said conveyor so as to provide four-point contact with said eggs, said guide rods then diverging toward the delivery end, tipping members mounted on said guide rods adjacent the point of divergence to tip said eggs from the vertical to nest between said rollers and said guide rods, and other wedge-like members secured to said guide rods adjacent the delivery end of said conveyor to engage and center said eggs between said guide rods to provide uniform center-to-center distance between said eggs.

11. In a device for spacing and aligning ovoid articles, a conveyor comprising a pair of spaced endless conveyor chains, a series of transversely positioned elongated rollers rotatably supported between said chains, horizontal rods positioned above said conveyor, said rods being equally spaced from one another and for a short distance running substantially parallel to the medial line of said conveyor, then the lateral plurality of rods diverging gradually to the full width of said conveyor, then the more medial of said plurality of rods subsequently and progressively diverging in radiant fashion, tipping members on said rods positioned adjacent the initial point of divergence to engage an object supported between said rods of said conveyor to tip said object laterally toward the next laterally adjacent diverging stationary rod, and means positioned along said conveyor commencing at a point subsequent to the position of said tipping members to rotate said rollers on their axis during transit beneath said stationary guide rods.

References Cited in the file of this patent

UNITED STATES PATENTS

| | | |
|---|---|---|
| 626,284 | Lyons | June 6, 1899 |
| 804,459 | Ellingwood | Nov. 14, 1905 |
| 1,220,801 | Varga | Mar. 27, 1917 |
| 2,135,778 | Wyland | Nov. 8, 1938 |
| 2,679,309 | Reading | May 25, 1954 |